May 16, 1961  W. FAIRHURST  2,984,611
NUCLEAR REACTOR FUEL ELEMENT
Filed Jan. 28, 1958
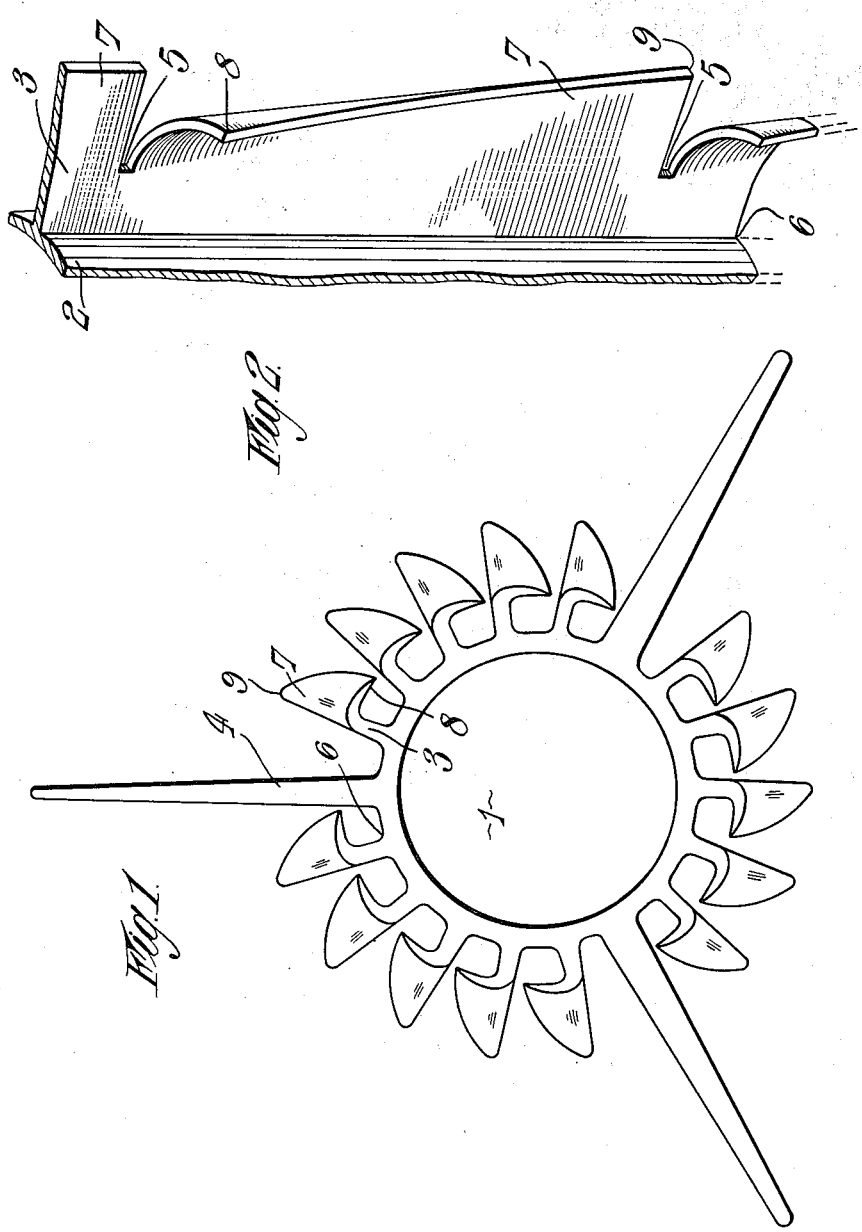
INVENTOR
WILLIAM FAIRHURST
BY
ATTORNEYS

United States Patent Office 2,984,611
Patented May 16, 1961

2,984,611
NUCLEAR REACTOR FUEL ELEMENT

William Fairhurst, Leyland, Preston, England, assignor to United Kingdom Atomic Energy Authority, London, England Filed Jan. 28, 1958, Ser. No. 711,652

Claims priority, application Great Britain Feb. 6, 1957

1 Claim. (Cl. 204—193.2)

This invention relates to nuclear reactors.

In the design of heterogeneous nuclear power reactors having fuel elements each comprising a fuel member enclosed in a finned protective sheath the problem arises of forming the fins on the sheath as economically as possible whilst providing a fuel element which has acceptable heat transfer properties. Thus, for example, although transverse fins generally have better heat transfer properties than longitudinal fins, transverse fins are currently formed by machining whereas longitudinal fins can be formed by the cheaper process of extrusion. This problem of forming the fins economically becomes even more difficult to overcome as more complex finning arrangements are introduced to improve the heat transfer properties between fuel and coolant without increasing pumping power in the same proportion, and it is an object of the present invention to provide a fuel element with complex finning which is capable of being basically formed by an extrusion process.

According to the invention a nuclear reactor fuel element comprising a fuel member enclosed in a protective sheath has fins of a section which can be formed by extrusion, at least some of said fins being slotted at intervals and the portions between slots deflected so that coolant gas flowing along the length of the fuel element is directed around the fuel element as well as along it.

Preferably splitter fins are provided at intervals round the element, extending radially outwards beyond the slotted fins for the length of the fuel element. The splitter fins may be formed by extrusion at the same time as the slotted fins. They serve to control the flow of coolant gas and can act as locating pieces when the fuel element is placed in a nuclear reactor.

One form of the invention will now be described with reference to the accompanying drawings in which Fig. 1 is a sectional plan view of a fuel element and Fig. 2 is a diagrammatic representation of a part of one fin of the fuel element of Fig. 1.

In the drawings a fuel element comprising a fuel member 1 enclosed in a protective sheath 2 has longitudinal fins 3 and longitudinal splitter fins 4 formed by extrusion. The fins 3 have slots 5 cut in circumferential bands round the fuel element. These slots extend only partway to the fin roots 6 (so as not to affect unduly the strength afforded by the longitudinal fins) leaving vanes 7 with corners 8 and 9. The corners 8 are all deflected slightly and curved over in the same direction leaving the corners 9 standing normal to the sheath 2. Coolant gas flowing over the fuel element is directed both along and around the element by the bent vanes 7. The circumferential deflection brings the coolant against the splitter fins 4 to set up a form of helical flow in sector shaped channels defined by the splitter fins.

Between each splitter fin 4 and the adjacent fin 3 which has its vanes 7 bent away from the splitter fin 4 is a channel through which streamline flow is possible. This flow may be avoided, if necessary, by having vanes 7 curved to cut into this channel.

I claim:

A nuclear reactor fuel element comprising a nuclear fuel member of elongate form enclosed in a protective sheath having two groups of longitudinal fins standing normal to the sheath, the fins of the first group being less deep than the fins of the second group and the fins of the second group being spaced between equal numbers of fins of the first group, means defining slots in the fins of the first group, said slots being less deep than said fins whereby said fins are divided into a series of vanes, each of said vanes having one corner curved over and deflected sideways so as to lie out of the plane of the fins from which each vane is formed and the other corner undeflected, deflected and undeflected corners occurring alternately along each slotted fin and each deflection of the vanes being in the same direction whereby coolant passing along the length of the fuel element between said fins of the first group is deflected by said curved vanes against said fins of the second group.

References Cited in the file of this patent
UNITED STATES PATENTS 1,786,571    Lonsdale _____ Dec. 30, 1930

FOREIGN PATENTS 431,655    Germany _____ July 14, 1926

OTHER REFERENCES

International Conf. on Peaceful Uses of Atomic Energy, vol. 9, 1955, pp. 221–230. (Copy in Library.)

Nuclear Power, May 1957, pp. 188–192. (Copy in Library.)